United States Patent [19]

Maekawa

[11] Patent Number: 4,556,332
[45] Date of Patent: Dec. 3, 1985

[54] ELECTRONIC TYPEWRITER INCLUDING RIGHT MARGIN ADJUSTING MEANS
[75] Inventor: Motoi Maekawa, Shizuoka, Japan
[73] Assignee: Tokyo Electric Co., Ltd., Tokyo, Japan
[21] Appl. No.: 508,493
[22] Filed: Jun. 27, 1983
[30] Foreign Application Priority Data
Mar. 3, 1983 [JP] Japan ................................. 58-34946
[51] Int. Cl.⁴ .............................................. B41J 5/30
[52] U.S. Cl. ............................................ 400/3; 400/7; 400/12; 400/64
[58] Field of Search ....................... 400/3, 7, 9, 12, 63, 400/64, 76, 157.3

[56] References Cited

U.S. PATENT DOCUMENTS 2,484,649 10/1949 Root, III ................................. 400/3
3,631,957 1/1972 Terry ..................................... 400/7
3,757,921 9/1973 Bishop .................................... 400/3
4,330,217 5/1982 Chorgovich et al. ................ 400/64
4,354,765 10/1982 Buchanan et al. ................ 400/63 X

FOREIGN PATENT DOCUMENTS 2087115 5/1982 United Kingdom ............. 400/157.3

Primary Examiner—Ernest T. Wright, Jr.
Attorney, Agent, or Firm—Frishauf, Holtz, Goodman & Woodward

[57] ABSTRACT

When a number of input key data sequentially stored in a first line buffer memory from a keyboard coincide with the contents of a right margin memory in a RAM, the line data up to the word immediately preceding the word reaching a preset right margin is sequentially transferred from the first line buffer memory to a second line buffer memory. The number of input key data from the immediately preceding word to the preset right margin is counted. In accordance with the count thus obtained, a spacing adjustment of the spaces left between words of the line data transferred to the second line buffer memory, is performed under the control of a CPU prior to printing of the words according to the contents of the second line buffer memory.

11 Claims, 10 Drawing Figures

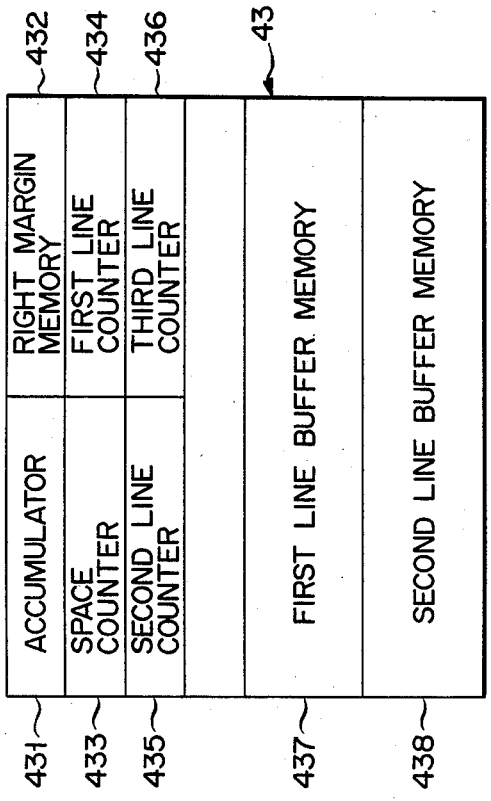

ELECTRONIC TYPEWRITER INCLUDING RIGHT MARGIN ADJUSTING MEANS

BACKGROUND OF THE INVENTION

The present invention relates to an electronic typewriter.

An electronic typewriter having a right justification function is conventionally known. In an electronic typewriter having this function, the right margin of each line of English text, for example, is justified. A method called the hot zone method is used to achieve this function. According to the hot zone method, a hot zone corresponding to 6 to 10 character spaces is set to the left of the preset right margin. A word falling in the hot zone of each line is discriminated to determine whether this word ends within the hot zone. More specifically, when the last character of a word starting before the hot zone of a line is included in the hot zone, or when the first and last characters of a word are both included in the hot zone, such a word is determined to be included in this line. In this case, the residual spaces from the last character of such a word in a line to the preset right margin, are distributed across the word spaces separating the words within this line, so that the last character of the last word is printed immediately on the preset right margin.

However, according to this hot zone method, a hot zone comprising 6 to 10 character spaces is relatively wide. For this reason, when a word ends at the first or second character, for example, of the hot zone of a line, the remaining 8 to 9 character spaces must be distributed across the word spaces between the words of this line if the next word has more than 8 or 9 characters. If a line is assumed to contain an average of 10 words, for example, one extra space must be distributed to each of the 9 word spaces between these words. Then, each word of this line is printed separated from the adjacent word by a wide space, resulting in a poor appearance of a printed document.

Furthermore, if the next line happens to end immediately on the preset right margin without requiring any justification, the wider spacing between each pair of adjacent words of the preceding line is emphasized, resulting in an even worse appearance of the document.

SUMMARY OF THE INVENTION

It is an object of the present invention to provide an electronic typewriter which is capable of right justification without requiring significant changes in word spaces between words from one line to another.

The above and other objects of the present invention are achieved by an electronic typewriter comprising: a first line buffer memory for sequentially storing printing data from a keyboard; means for discriminating if the printing data which is stored last in said first line buffer memory is character data of one word when a storage position of the printing data stored in said first line buffer memory reaches a position corresponding to a preset right margin; means for reading out line data from said first line buffer memory when the printing data which is stored last in said first line buffer memory is the character data of the one word, the line data consisting of the printing data up to an immediately preceding word; a second line buffer memory for storing the line data from said reading means; and a printing mechanism for printing the contents of said second line buffer memory.

BRIEF DESCRIPTION OF THE DRAWINGS

FIG. 4 shows the memory allocation of a RAM shown in FIG. 3;

FIGS. 6A to 6C show a representation of the printing transfer of printing data between the line buffer memories.

DETAILED DESCRIPTION OF THE PREFERRED EMBODIMENT

Figure 1:
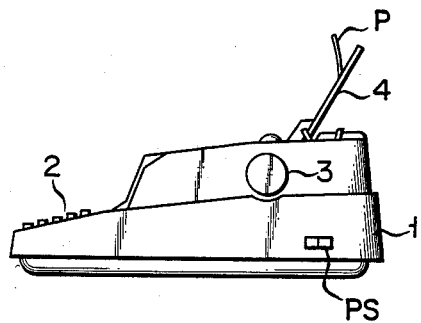
FIG. 1 is a side view of an electronic typewriter according to an embodiment of the present invention.

Referring to FIG. 1, an operation section 2 including a keyboard is formed at the front top surface of a typewriter casing 1. A platen knob 3 extends from both sides of the casing 1, and a paper stand 4 is mounted on the rear top surface of the casing 1.

Figure 2:
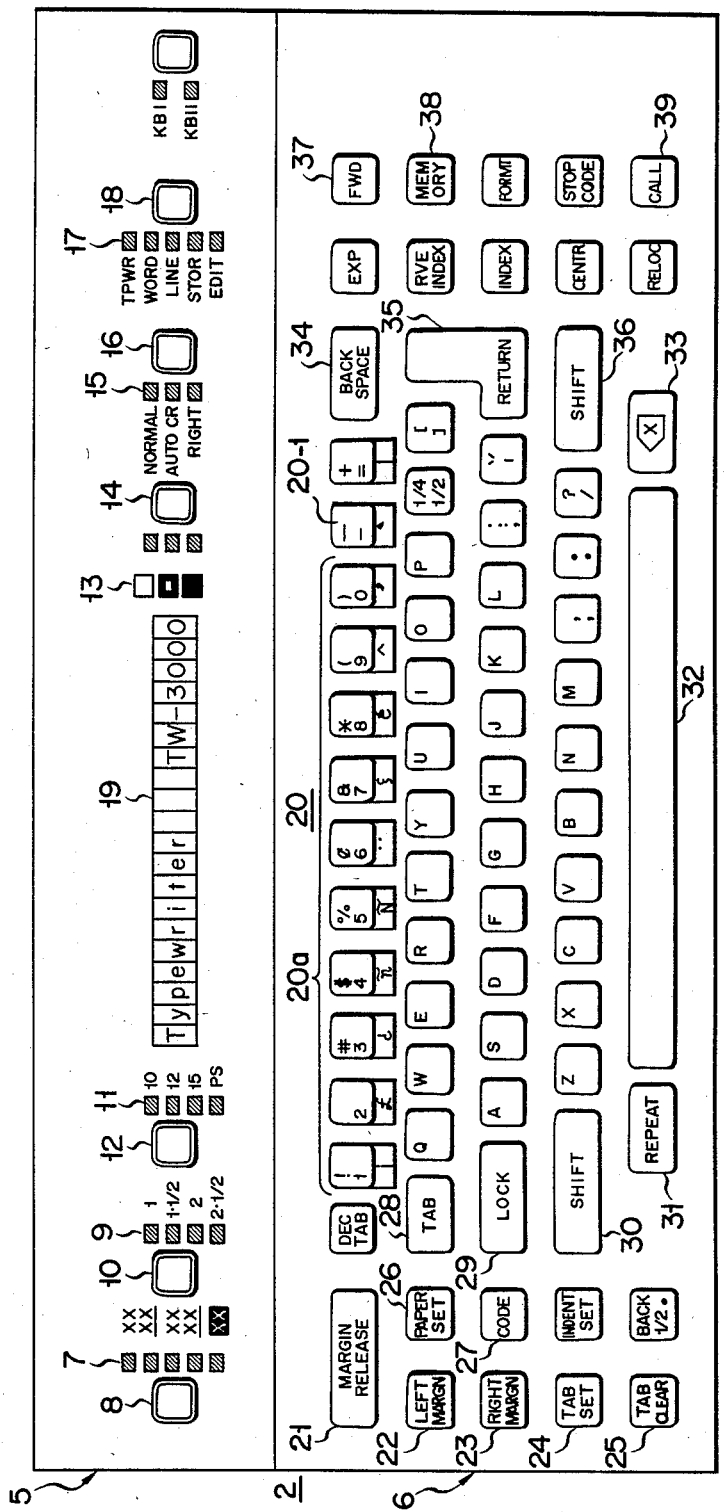
FIG. 2 is a plan view of an operation section of the typewriter shown in FIG. 1.

As shown in FIG. 2, the operation section 2 consists of a display unit 5 and a keyboard 6. A print mode display section consisting of a print mode LED indicator 7 and a print mode switch 8 is arranged at the left end of the display unit 5. When the print mode switch 8 is operated, the print mode is switched. The set mode is indicated by a corresponding one of five LEDs of the LED indicator 7. The print modes which may be set are normal printing, underlined normal printing, bold printing, underlined bold printing, and reverse printing.

A line spacing display section and a typing pitch display section are sequentially arranged next to the print mode display section. The line spacing display section consists of a line spacing LED indicator 9 and a line spacing switch 10. When the line spacing switch 10 is operated, the feed pitch of a typing sheet P is switched in the order of 1/6 inch, ¼ inch, ⅓ inch and ½ inch. In correspondence with the selected line spacing, four LEDs of the LED indicator 9 are selectively lit.

The typing pitch display section consists of a typing pitch LED indicator 11 and a typing pitch switch 12. When the typing pitch switch 12 is operated, four LEDs of the indicator 11 are selectively lit to indicate a pitch of one of 10, 12, and 15 characters per inch or proportional spacing.

The display unit 5 further includes a copy control display section for controlling the density of the copy or copies, and a right margin display section for displaying the operation mode of the right margin. The copy control display section consists of a copy control LED indicator 13 and a copy control switch 14. Every time the copy control switch 14 is operated, the density of the copy to be produced is switched in one of three steps, and the corresponding LED of the indicator 13 is lit.

The right margin display section consists of a right margin LED indicator 15 and a right margin switch 16. When the right margin switch 16 is operated, the operation mode of the right margin is switched in the order of normal, automatic carriage return, and right justification. At the same time, a corresponding LED of the LED indicator 15 is lit.

The display unit 5 further includes a memory mode display section and a dot display 19. The dot display 19 is arranged at the central position of the display unit 5 and can display 20 alphanumeric characters. The memory mode display section consists of a memory mode LED indicator 17 having five LEDs, and a memory mode switch 18. When the switch 18 is operated, one of the LEDs of the LED indicator 17 is lit so as to indicate one of the selected modes: typewriter mode, word mode, line mode, store mode, and edit mode.

In the typewriter mode, every time a character key among character keys 20 (FIG. 2) on the keyboard 6 is depressed, the corresponding character is printed. The printing data is not stored in a line buffer memory 438 (FIG. 4); in this mode.

In the word mode, printing of the entered characters is not performed upon depressing the individual character keys 20. However, every time a space bar 32 or a hyphen key 20-1 is operated, the corresponding word is printed. In this case, the printing data is not stored in the memory 438.

In the line mode, printing is performed in units of lines, and the printing data is not stored in the memory 438. Printing of each line is performed after printing data of one line is entered, that is, when the carriage return key 35 is operated.

In the store mode, the printing data entered by depressing the character keys 20 is stored in a line buffer memory 437. In this mode, printing data of one line is read out from the line buffer memory 437 and is printed. At the same time, new printing data is stored in the line buffer memory 437.

In the edit mode, the data stored in the sentence mode is edited or modified, and printing is not performed.

A group of character keys 20 and various function keys are arranged on the keyboard 6. The character keys 20a include ten keys from "0" to "9", character keys 20 from "A" to "Z", a hyphen input key 20-1 and the like. The function keys include a margin release key 21, a left margin key 22, a right margin key 23, a tab set key 24, a tab clear key 25, a paper set key 26, a code key 27, a tab key 28, a shift lock key 29, a shift key 30, a repeat key 31, a space bar 32, a correction key 33, a backspace key 34, a carriage return key 35, a shift key 36, a forward key 37, a memory key 38, and a call key 39. The operations to be effected by these function keys 21 to 39 are well known from those of a conventional typewriter, and will not be described in detail here.

Figure 3:
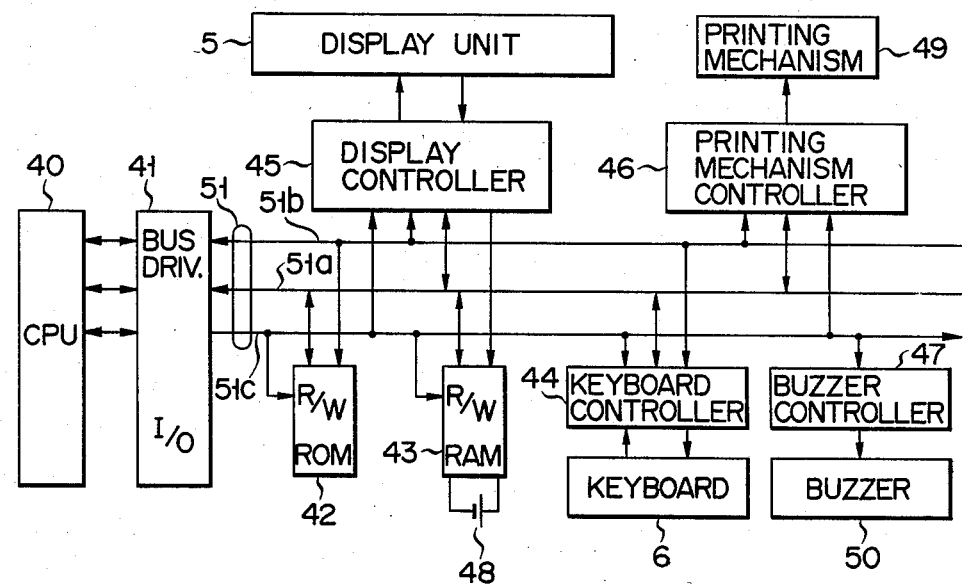
FIG. 3 is a block diagram of the typewriter of the embodiment shown in FIG. 1.

Referring to FIG. 3, the circuit configuration of the electronic typewriter of the present invention will now be described. A CPU 40 is connected to the respective parts of the typewriter through a bus driver and I/O port 41 and a bus 51. The bus 51 consists of a data bus 51a, an address bus 51b and a control bus 51c, each of which is connected to a ROM 42, a RAM 43, a keyboard controller 44, a display controller 45, and a printing mechanism controller 46. The keyboard controller 44 is connected to the keyboard 6, the display controller 45 is connected to the display unit 5, and the printing mechanism controller 46 is connected to a printing mechanism 49. The control bus 51c is connected to a buzzer 50 through a buzzer controller 47. A backup battery 48 is connected to the RAM 43 as is common in the art.

The ROM 42 stores program data according to which the CPU 40 controls the respective circuit parts. Meanwhile, the RAM 43 is divided into a plurality of memory areas as shown in FIG. 4, each of which is used as a counter, a buffer memory or the like. More specifically, the RAM 43 is divided into an accumulator 431, a right margin memory 432, a space counter 433, a first line counter 434, a second line counter 435, a third line counter 436, a first line buffer memory 437, and a second line buffer memory 438. The group of character keys 20 and various function keys on the keyboard 6 are associated with key switches (not shown) as is well known in the art.

The keyboard controller 44 scans the respective key switches of the keyboard 6 and supplies a key signal corresponding to an operated key to the CPU 40. The display controller 45 generates a display drive signal which is supplied to the LED indicators 7, 9, 11, 13, 15 and 17 and the dot display 19 so as to perform a predetermined display. The printing mechanism 49 comprises a printing head, a carriage and the like, which are controlled by the printing mechanism controller 46. A printing mechanism having a character forming element (head) and a carrier as shown in U.S. Pat. No. 4,330,217 may be used as the printing mechanism 49.

Figure 5A:
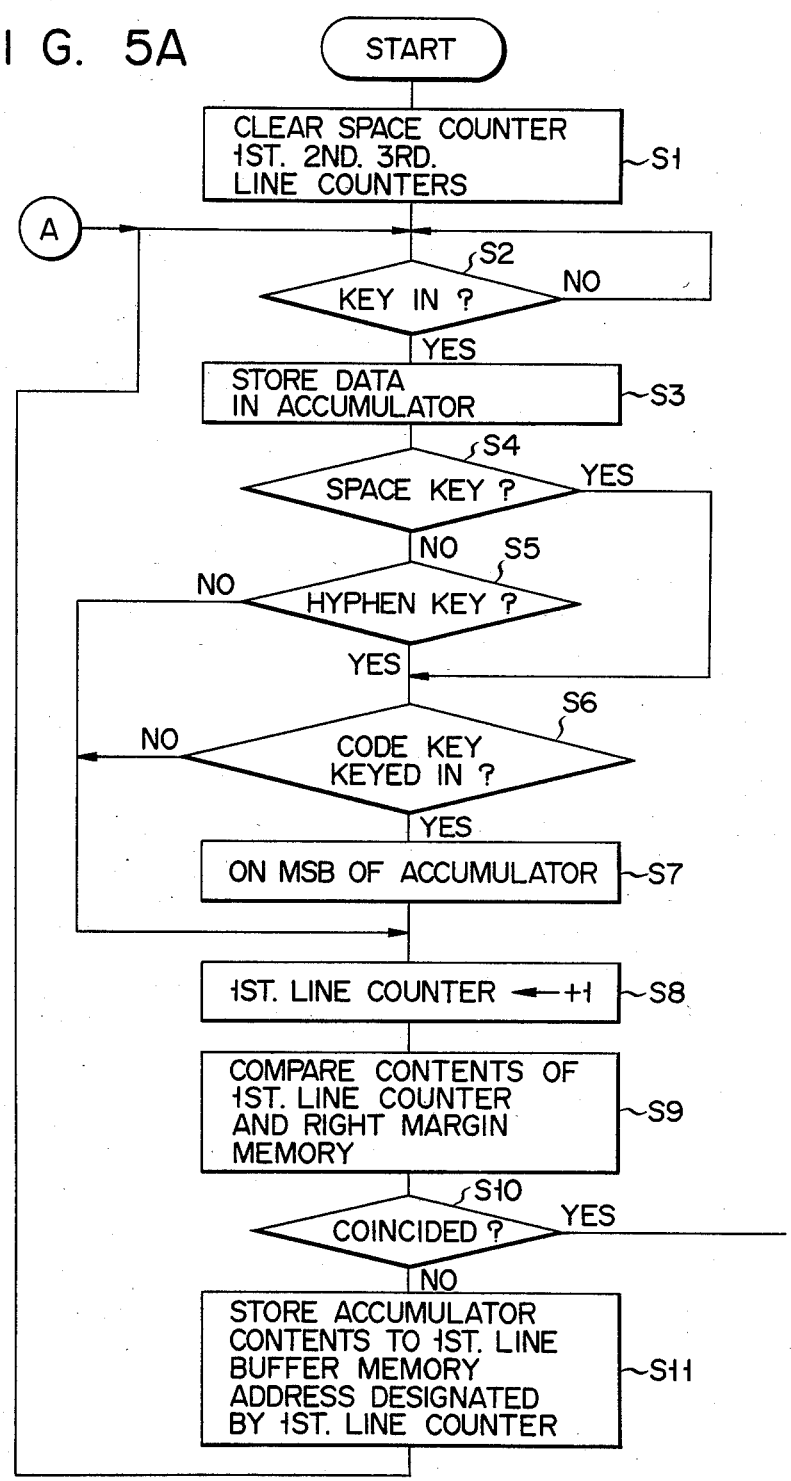
FIGS. 5A to 5C show a flow chart for explaining the mode of operation of the embodiment shown in FIGS. 1 to 3.

The mode of operation of the electronic typewriter of this embodiment will now be described with reference to FIGS. 5A–5C and 6A–6C. When a power switch PS of FIG. 1 is turned on, step S1 of the flow chart shown in FIG. 5A is executed so as to clear the space counter 433 and the first through third line counters 434 through 436 in the RAM 43. In step S2, it is discriminated if key data is input from the keyboard 6. If YES in step S2, the key data is supplied to the RAM 43 and is stored in the accumulator 431 in step S3. In steps S4 and S5, it is discriminated if the stored data is space data from the space bar 32, hyphen key data from the hyphen key 20-1, or other data.

If the stored data is either space data or hyphen data, it is then discriminated in step S6 whether the immediately preceding data is code key data from the code key 27. If YES in step S6, the most significant bit (MSB) of the accumulator 431 is set to "1" in a step S7, thereby providing a particular significance to the space or hyphen data stored in the accumulator 431.

When any key is operated, the first line counter 434 is incremented by one in step S8. In step S9, the contents of the first line counter 434 and those of the right margin memory 432 are compared with each other. It is then discriminated in step S10 whether the contents of the first line counter 434 and the right margin memory 432 coincide with each other. If NO in step S10, the contents of the accumulator 431 are stored at the address of the first line buffer memory 437 which is designated by the first line counter 434, in step S11. On the other hand, if YES in step S10, the contents of the first line counter 434 are decremented by one, and the contents at the address of the first line buffer memory 437 designated by the first line counter 434 are transferred to the accumulator 431, in step S12. Then, the space counter 433 is incremented by one in step S13.

The flow advances to step S14. In step S14, it is discriminated if the contents transferred to the accumulator 431 are space data. If NO in step S14, it is then checked in step S15 whether the contents are hyphen data. If YES in step S15, it is discriminated in step S16 whether the hyphen data represents a permanent hyphen which has a particular significance. If YES in step S14, the flow advances to step S17 wherein it is discriminated if the space data represents a permanent space which has a particular significance.

When the data transferred to the accumulator 431 is determined to be data other than space or hyphen data, a permanent space, and a permanent hyphen through steps S14 to S17, the flow returns from steps S15, S16 and S17, respectively, to step S12. In step S12, the first line counter 434 is decremented by one, and the contents at the address of the first line buffer memory 437 designated by the first line counter 434 are transferred to the accumulator 431. A similar processing is performed thereafter.

However, when the data read in the accumulator 431 is either ordinary space or ordinary hyphen data, the flow advances from step S16 or S17 to S18. In step S18, the data at the address of the first line buffer memory 437 which is designated by the contents of the second line counter 435 are transferred to the accumulator 431. In step S19, the second line counter 435 is incremented by one. It is then checked in step S20 whether the contents of the accumulator 431 are space data. If YES in step S20, it is then checked in step S21 whether the space data is permanent space data. If NO in step S21, it is checked in step S22 whether the contents of the space counter 433 are "0". If NO in step S22, the flow advances in step S23 wherein the space counter 433 is decremented by one. In step S24, the space data stored in the accumulator 431 is stored at the address of the second line buffer memory 438 which is designated by the contents of the third line counter 436. In the next step S25 the third line counter 436 is incremented by one.

Step S26 is executed after step S25 when the contents of the accumulator 431 are space data and permanent space data, the contents of the space counter 433 are "0", or the contents of the accumulator 431 are not space data. In step S26, the contents of the accumulator 431 are stored at the address of the second line buffer memory 438 which is designated by the third line counter 436. In step S27, the third line counter 436 is incremented by one.

Thereafter, in step S28, it is discriminated whether the contents of the first and second line counters 434 and 435 coincide with each other. If NO in step S28, the flow returns to step S18 to transfer the contents of the first line buffer memory 437 to the accumulator 431.

If YES in step S28, the second line counter 435 is cleared in step S29. In the next step S30, data is read out from the address of the first line buffer memory 437 which is designated by the first line counter 434, and is stored at the address of the first line buffer memory 437 which is designated by the second line counter 435. Thereafter, the first and second line counters 434 and 435 are incremented by one, respectively, in step S31. This operation is repeated through steps S32 and S33 until the contents of the first line counter 434 coincide with those of the right margin memory 432.

When these contents coincide in step S33, the contents of the second line counter 435 are transferred to the first line counter 434, in step S34. In step S35, the contents stored from the address of the first line buffer memory 437 designated by the second line counter 435 to the address designated by the right margin memory 432 are cleared. Then, in step S36, the second line counter 435 is cleared.

The flow then advances to step S37. In step S37, printing data is read out from the address of the second line buffer memory 438 designated by the second line counter 435. In accordance with the printing data thus read out, in step S38 the carriage and the printing head of the printing mechanism 49 are driven to print one character. When one character is printed in this manner, the second line counter 435 is incremented by one in step S39. In step S40, it is checked whether the contents of the second and third line counters 435 and 436 coincide with each other. If NO in step S40, the flow returns to step S37 so as to sequentially read out and print the characters addressed by the second line counter 435.

However, when YES in step S40, the carriage is returned to the left margin position and line feed is simultaneously performed in step S41. In step S42, the second and third line counters 435 and 436 are cleared. The entire flow then returns to step S2 to await further key input. The same routine is repeated accordingly.

Figure 5B:
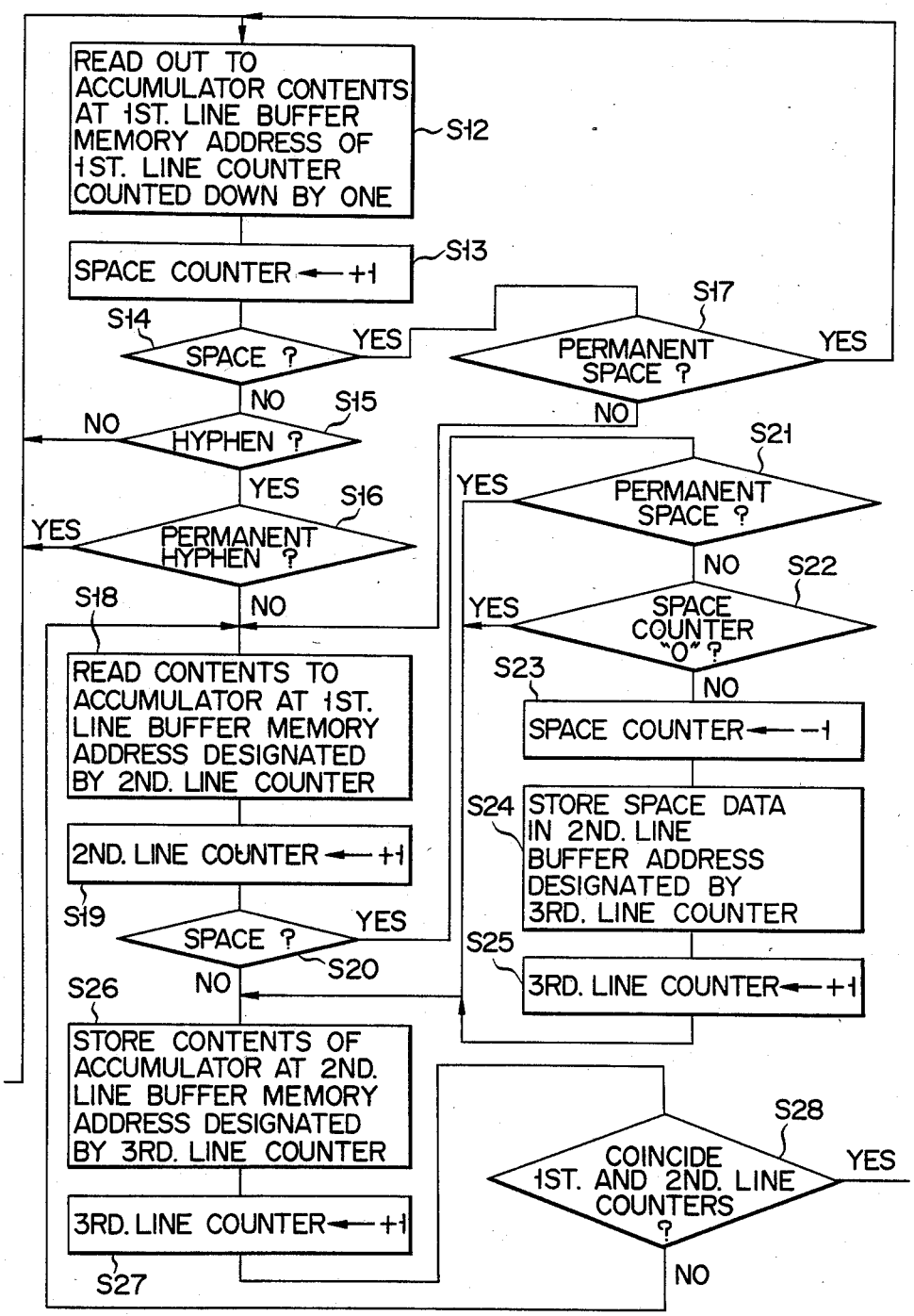
Figure 5C:
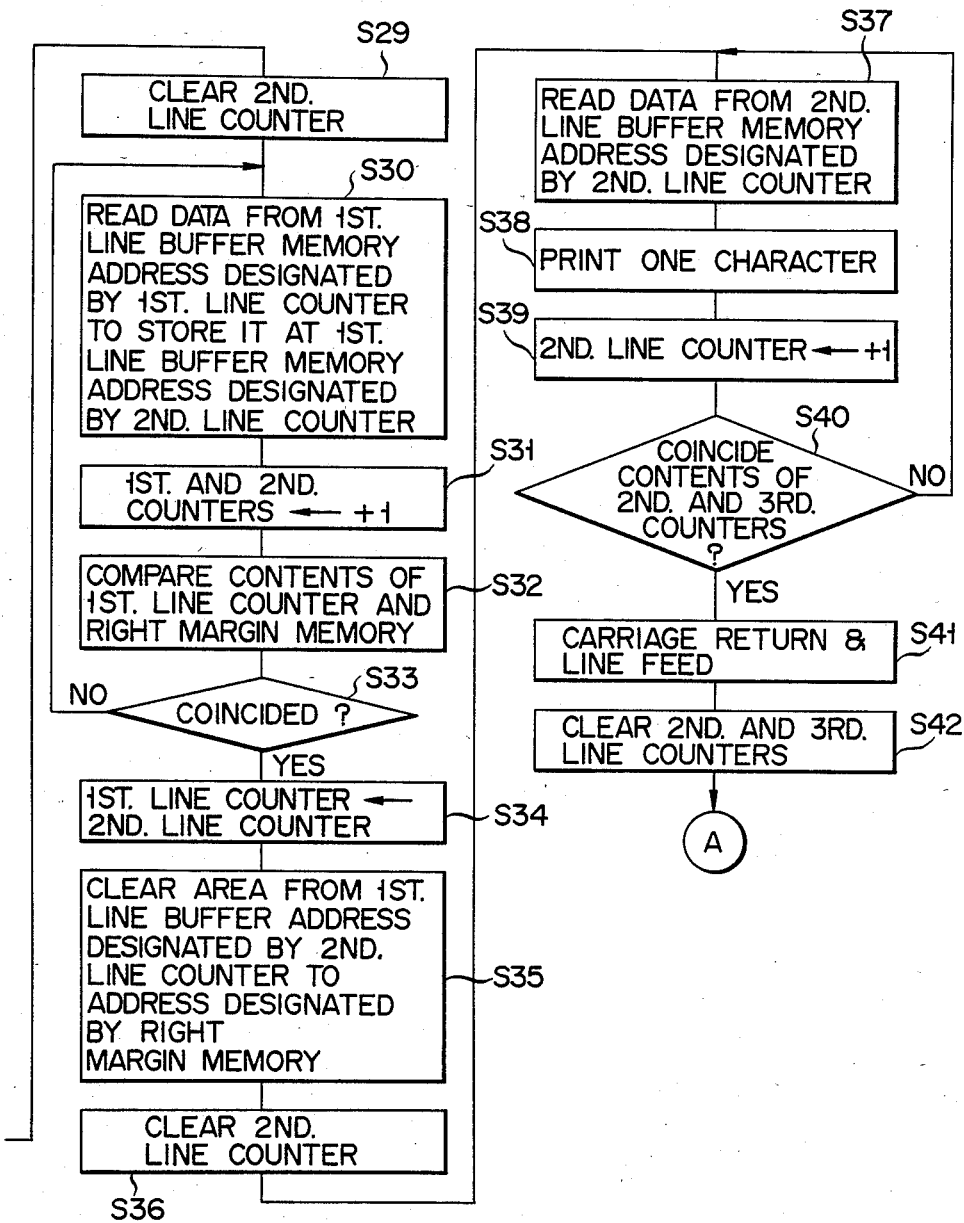

The operation the flow of which is shown in FIGS. 5A-5C will be supplementarily described hereinafter for easy understanding. Every time a character key 20 or the like is operated, the first line counter 434 counts the number of characters input. The input character data is stored at suitable addresses in the first line buffer memory 437. When the space bar 32 or the hyphen key 20-1 is depressed in combination with the code key 27, the input space or hyphen has a particular significance and the MSB of the input data is set to "1", for example. The key input is performed until the contents of the first line counter 434 coincide with those of the right margin memory 432 and the character data up to the right margin position is stored in the first line buffer memory 437. Then, the CPU 40 supplies a control signal to the buzzer controller 47 which drives the buzzer 50 so as to signal to the operator completion of data input of one line.

At this time, it is checked if the character at the right margin position is a character in the middle of a word. This is performed in steps S12 and thereafter wherein the first line counter 434 is decremented by one, the contents at the address of the first line buffer memory 437 designated by the counter 434 are read out and transferred to the accumulator 431, and the space counter 433 is incremented by one. Thereafter, the readout operation is continued until an ordinary space or hyphen is entered. This processing is performed so as to detect a space or a hyphen between a word involving the right margin position and the immediately preceding word. A permanent space or hyphen is handled as a part of the word. Therefore, the space counter 433 counts the number of characters from the right margin position to the first ordinary space or hyphen to the left.

The contents of the first line memory 437 are transferred to the second line buffer memory 438. This operation is executed in steps S18 and thereafter. If a space is included and this space is an ordinary space, new space data is stored in the second line buffer memory 438 before the space data is transferred to the second buffer memory 438. When the space data is transferred from the first line buffer 437 to the second line buffer memory 438, an extra character space is added to provide a 2-character word space. Addition of an extra space is sequentially performed from the start of each printing line, that is, from the left end thereof. Every time an extra space is added, the space counter 433 is decremented by one. Addition of extra spaces is performed until the contents of the space counter 433 become "0".

As described above, the third line counter 436 counts the number of characters stored in the second line buffer memory 438. When the contents of the first line counter 434 coincide with those of the second line counter 435, and transfer of printing data up to the last character of the word immediately preceding a word involving the right margin position in the first line buffer memory 437 is completed, the transfer control is completed. As a result, the data up to the word immediately preceding the word involving the right margin position in the first line buffer memory 437 is stored in the second line buffer memory 438 such that the word spacing are adjusted to end the line just on the right margin position.

When the transfer control is completed in this manner, the word involving the right margin position which is left untransferred in the first line buffer memory 437 is read out. The word is then restored from the start address of the first line buffer memory 437 utilizing the second line counter 435. Data other than the data of this word is cleared.

The address of the characters stored in the first line buffer memory 437 is counted by the second line counter 435 and is transferred to the first line counter 434 for storing the next key input data. The printing data of one line stored in the second line buffer memory 438 is called in units of characters and is printed by the printing mechanism 49.

FIGS. 6A to 6C show an example of transfer control from the first line buffer memory 437 to the second line buffer memory 438. Assume that, as shown in FIG. 6A, a sentence "The head and in frontal attack on an english" is to be keyed in. When the right margin is set at position No. 40, the letter "l" of the last word "english" corresponds to the right margin position. Then, the spacing adjustment as described above is performed such that the last letter "n" of the the word "an" immediately preceding the word "english" comes to the preset right margin position. Thus, a total of 5 character spaces consisting of one character space between "an" and "engl" and the four characters "e", "n", "g" and "l" are distributed to the respective word spaces from the left end of the line, thereby performing printing as shown in FIG. 6B. The character data "engl" remaining after this spacing adjustment is stored from the start address of the first line buffer memory 437 as shown in FIG. 6C.

In this manner, with the typewriter of the present invention, even when right justification is performed, the number of extra spaces added is smaller than in the case of a conventional typewriter, so that a document may be printed with good spacing balance.

In the example described above, when the space between "an" and "engl" is a permanent space, the printing data up to "an" is stored as the data of this line in the second line buffer memory 438. In this case, the data of "an english" is printed on the next line. Furthermore, the data is printed similarly when a permanent hyphen occurs between "an" and "engl".

As shown in FIG. 6C, since "engl" key input is sequentially stored from the start address of the first buffer memory 437, key-in after the operation of the buzzer 50 need only start from "ish" following "engl". Accordingly, the same character data need not be keyed in twice, which is convenient.

The above embodiment is described with reference to a case wherein, in transfer control of the printing data from the first line buffer memory 437 to the second line buffer memory 438, the word spaces are adjusted so that the last word of each line ends at the preset right margin position. However, according to the present invention, when transfer control from the first line buffer memory 437 to the second line buffer memory 438 is performed, spacing adjustment need not be performed. In this case, even though the right end of each line may be more or less unjustified, the degree of such unjustified appearance is less than in the case of a typewriter adopting the hot zone method. In other words, the typewriter of the present invention allows rough right justification even when spacing adjustment is not performed.

In summary, according to the typewriter of the present invention, the right margin of each line may be roughly adjusted without requiring the spacing adjustment operation. Furthermore, when spacing adjustment is to be performed, the number of extra spaces to be distributed is reduced to the minimum, producing a document having a good appearance and good readability.

What is claimed is:

1. An electronic typewriter, comprising:
    a keyboard for generating printing data including space data and word data including at least one character data;
    means for presetting a right margin position;
    a first line buffer memory for sequentially storing the generated printing data from said keyboard;
    means for counting a storage position of the printing data stored in said first line buffer memory;
    means for discriminating if the printing data which is stored last in said first line buffer memory is a character data included in said word data when the counted storage position reaches said preset right margin position;
    means for reading out all the printing data of one line lastly stored in said first line buffer memory, except for the character data which is stored last in said first line buffer memory, when said discriminating means discriminates that the counted storage position of the character data last stored in said first line buffer memory reaches said preset right margin position;
    a second line buffer memory for storing said read out printing data of one line;
    a printing mechanism for printing the printing data of one line stored in said second line buffer memory; and
    means for actuating the printing operation of said printing mechanism when the printing data of one line is stored in said second line buffer memory.

2. A typewriter according to claim 1, further comprising:
    means for sequentially storing the character data of said word data which is stored last in said first line buffer memory; and
    means for sequentially storing in said first line buffer memory remaining character data of said word data and printing data which is continuously entered from said keyboard.

3. A typewriter according to claim 2, further comprising:
    means for counting a total number of input key data including characters of said word data involving the preset right margin and a space entered between said word data involving the preset right margin and the immediately preceding word data; and
    spacing adjusting means for adding, in accordance with contents of said counting means, extra spaces to spaces already separating respective words when the line data is transferred from said first line buffer memory to said second line buffer memory.

4. A typewriter according to claim 3, wherein:
said keyboard includes a space bar; and
said typewriter further includes means for providing a particular significance to space data input by said space bar, which space data is inserted between predetermined words entered from said keyboard; and
a right margin memory for storing the preset right margin, and
wherein said reading means reads out, when the space between said word data involving the preset right margin and said immediately preceding word has the particular significance, the line data of a line up to a second preceding word before said immediately preceding word by handling said word data involving the preset right margin and the immediately preceding word as a single word.

5. A typewriter according to claim 3, wherein:
said keyboard includes a hyphen input key; and
said typewriter further includes means for providing a particular significance to hyphen data entered by said hyphen input key;
a right margin memory for storing the preset right margin, and
wherein said reading means reads out, when a hyphen between said word data involving the preset right margin and said immediately preceding word has the particular significance, the line data of a line up to a second preceding word before said immediately preceding word by handling said word data involving the preset right margin and said immediately preceding word as a single word.

6. A typewriter according to claim 4, wherein said means for providing the particular significance to said space data comprises a code key arranged at said keyboard.

7. A typewriter according to claim 5, wherein said means for providing the particular significance to said hyphen data comprises a code key.

8. A typewriter according to claim 1, wherein;
said keyboard includes a space bar for entering space data; and
the typewriter further includes:
means for providing a particular significance to the space data entered by said space bar, which space data is inserted between certain word data entered from said keyboard; and
a right margin memory for storing the preset right margin position; and
wherein said reading means is arranged so that when the space data entered between word data involving the preset right margin position and an immediately preceding word has said particular significance, only the data stored in said first line buffer memory up to a second preceding word positioned before said immediately preceding word is read out by said reading means, wherein said word data involving the preset right margin position and the immediately preceding word are handled by said reading means as a single word.

9. A typewriter according to claim 8, wherein said means for providing the particular significance to said space data comprises a code key arranged at said keyboard.

10. A typewriter according to claim 1, wherein:
said keyboard includes a hyphen input key for entering hyphen data; and
the typewriter further includes:
means for providing a particular significance to the hyphen data entered by said hyphen input key; and
a right margin memory for storing the preset right margin position; and
wherein said reading means is arranged so that when hyphen data entered between word data involving the preset right margin position and an immediately preceding word has said particular significance, only the data stored in said first line buffer memory up to a second preceding word position before said immediately preceding word is read out by said reading means, wherein said word data involving the preset right margin position and said immediately preceding word are handled by said reading means as a single word.

11. A typewriter according to claim 10, wherein said means for providing the particular signficance to said hyphen data comprises a code key arranged at said keyboard.

* * * * *